United States Patent
Sim et al.

(10) Patent No.: US 11,314,130 B2
(45) Date of Patent: Apr. 26, 2022

(54) DISPLAY DEVICE INCLUDING COLUMN SPACERS

(71) Applicant: Samsung Display Co., Ltd., Yongin-Si (KR)

(72) Inventors: Jun Bo Sim, Seongnam-si (KR); Ju Yong Park, Asan-si (KR); Da Young Lee, Seoul (KR); Jeong Uk Heo, Asan-si (KR)

(73) Assignee: Samsung Display Co., Ltd.

(*) Notice: Subject to any disclaimer, the term of this patent is extended or adjusted under 35 U.S.C. 154(b) by 0 days.

(21) Appl. No.: 16/890,989

(22) Filed: Jun. 2, 2020

(65) Prior Publication Data

US 2021/0149237 A1   May 20, 2021

(30) Foreign Application Priority Data

Nov. 19, 2019   (KR) ........................ 10-2019-0148747

(51) Int. Cl.
  *G02F 1/1368*  (2006.01)
  *G02F 1/1339*  (2006.01)
  *G02F 1/1362*  (2006.01)

(52) U.S. Cl.
  CPC ........ *G02F 1/13394* (2013.01); *G02F 1/1368* (2013.01); *G02F 1/136227* (2013.01); *G02F 1/136286* (2013.01); *G02F 2201/121* (2013.01); *G02F 2201/123* (2013.01); *G02F 2201/52* (2013.01)

(58) Field of Classification Search
  CPC .................................................. G02F 1/13394
  See application file for complete search history.

(56) References Cited

U.S. PATENT DOCUMENTS

| | | | |
|---|---|---|---|
| 2011/0187631 A1* | 8/2011 | Lee | G09G 3/36 345/87 |
| 2018/0031888 A1* | 2/2018 | Yu | G02F 1/13394 |
| 2018/0143471 A1* | 5/2018 | Park | G02F 1/13394 |
| 2018/0275468 A1* | 9/2018 | Hirosawa | G02F 1/133512 |
| 2019/0326560 A1* | 10/2019 | Cha | H01L 51/5237 |

FOREIGN PATENT DOCUMENTS

| | | |
|---|---|---|
| KR | 10-2015-0137236 A | 12/2015 |
| KR | 10-1607635 B1 | 3/2016 |
| KR | 10-2017-0082696 A | 7/2017 |
| KR | 10-1820533 B1 | 1/2018 |
| KR | 10-1899095 B1 | 10/2018 |

* cited by examiner

*Primary Examiner* — Sang V Nguyen

(74) *Attorney, Agent, or Firm* — Innovation Counsel LLP

(57) ABSTRACT

A display device includes: a first substrate; a second substrate overlapping the first substrate; a common electrode disposed on the second substrate; a column spacer disposed between the pixel electrode and the common electrode; and a plurality of pixels. Each of the plurality of pixels includes a transistor disposed on the first substrate and a pixel electrode electrically connected to the transistor through a hole. The display device further includes a plurality of column spacers disposed between the pixel electrode and the common electrode. The plurality of column spacers include a main spacer having a first height and a sub-spacer having a second height that is different from the first height. At least one of the main spacer and the sub-spacer includes a first spacer having a first planar area and a second planar spacer having a second planar area that is different from the first planar area.

17 Claims, 10 Drawing Sheets

DISPLAY DEVICE INCLUDING COLUMN SPACERS

CROSS-REFERENCE TO RELATED APPLICATION

This application claims priority to and the benefit of Korean Patent Application No. 10-2019-0148747 filed in the Korean Intellectual Property Office on Nov. 19, 2019, the disclosure of which is incorporated herein by reference in its entirety.

BACKGROUND

1. Field

The present disclosure relates generally to a display device, more particularly to a display device including column spacers.

2. Description of the Related Art

Various types of display devices such as a liquid crystal display and an organic light emitting diode display are widely used. A typical display device includes pixels for displaying an image, and each pixel includes a pixel electrode for receiving a data signal for displaying a predetermined luminance. The pixel electrode may be electrically connected to a data line for transmitting the data signal through a switching element such as a transistor. The pixel electrode and the switching element may be electrically connected by forming a hole that penetrates through an insulating layer interposed therebetween, and contacting the pixel electrode or a conductor that is electrically connected to the pixel electrode with the switching element through the hole. In this sense, the hole may be referred to as a contact hole.

The above information disclosed in this Background section is only for enhancement of understanding of the background of the present disclosure, and therefore it may contain information that does not form a prior art that is known to a person of ordinary skill in the art at the time of filing the present application.

SUMMARY

The present disclosure provides a display device including a column spacer for stably maintaining a separation gap between display panels.

According to one embodiment of the present disclosure, a display device includes: a first substrate; a second substrate overlapping the first substrate; a common electrode disposed on the second substrate; and a plurality of pixels. Each of the plurality of pixels comprising a transistor disposed on the first substrate and a pixel electrode electrically connected to the transistor through a hole. The display device may further include a plurality of column spacers disposed between the pixel electrode and the common electrode, wherein the plurality of column spacers may include a main spacer having a first height and a sub-spacer having a second height that is different from the first height, and at least one of the main spacer and the sub-spacer may include a first spacer having a first planar area and a second planar spacer having a second planar area that is different from the first planar area.

The plurality of pixels may include a first pixel displaying a first color, a second pixel displaying a second color, and a third pixel displaying a third color.

The planar area of a first main spacer disposed in the first pixel may be smaller than that of a third main spacer disposed in the third pixel.

A straight line distance between the first main spacer and a first hole disposed in the first pixel may be greater than that between the third main spacer and a third hole disposed in the third pixel.

A planar area of a second main spacer disposed in the second pixel may be smaller than or equal to that of a third main spacer disposed in the third pixel.

A straight line distance between the second main spacer and a second hole disposed in the second pixel is greater than or equal to that between the third main spacer and a third hole disposed in the third pixel.

A planar area of a first sub-spacer disposed in the first pixel may be smaller than that of a third sub-spacer disposed in the third pixel.

A straight line distance between the first sub-spacer and a first hole disposed in the first pixel may be greater than that between the third sub-spacer and a third hole disposed in the third pixel.

A planar area of the sub-spacer disposed in the second pixel may be smaller than or equal to that of the sub-spacer disposed in the third pixel.

A straight line distance between a second sub-spacer and the hole disposed in the second pixel may be greater than or equal to that between a third sub-spacer and the hole disposed in the third pixel.

The first pixel may display a red color, the second pixel may display a green color, and the third pixel may display a blue color.

A first hole included in the first pixel, a second hole included in the second pixel, and a third hole included in the third pixel may have different sizes.

A planar size of the first hole included in the first pixel may be smaller than that of the third hole included in the third pixel.

A first hole included in the first pixel, a second hole included in the second pixel, and a third hole included in the third pixel may have a same size.

A planar size of a third column spacer included in the third pixel may be smaller than that of a first column spacer included in the first pixel.

According to another embodiment of the present disclosure, a display device includes: a first substrate; a second substrate overlapping the first substrate; a common electrode disposed on the second substrate; a plurality of column spacers disposed between the pixel electrode and the common electrode; and a plurality of pixels comprising a first pixel and a second pixel. The first pixel may include a first pixel electrode electrically connected to a first transistor disposed on the first substrate through a first hole, and the second pixel may include a second pixel electrode electrically connected to a second transistor disposed on the first substrate through a second hole. A first distance between a first column spacer of the plurality of column spacers and the first hole may be different from a second distance between a second column spacer of the plurality of column spacers and the second hole.

The plurality of pixels may further include a third pixel including a third pixel electrode electrically connected to a third transistor disposed on the first substrate through a third hole. The first pixel may display a first color, the second pixel may display a second color, and the third pixel may display a third color. The first hole included in the first pixel, the second hole included in the second pixel, and the third hole included in the third pixel may have different planar sizes, and a planar area of a first column spacer disposed in the first pixel may be smaller than that of a third column spacer disposed in the third pixel.

The first hole included in the first pixel, the second hole included in the second pixel, and the third hole included in the third pixel may have a same planar size.

A planar size of a third column spacer included in the third pixel may be smaller than that of a first column spacer included in the first pixel.

A first distance between a third column spacer and the third hole included in the third pixel may be greater than that between a first column spacer and the first hole included in the first pixel.

Since the column spacers stably maintain a separation gap between the display panels, the display device may have improved reliability.

DETAILED DESCRIPTION

Figure 1:
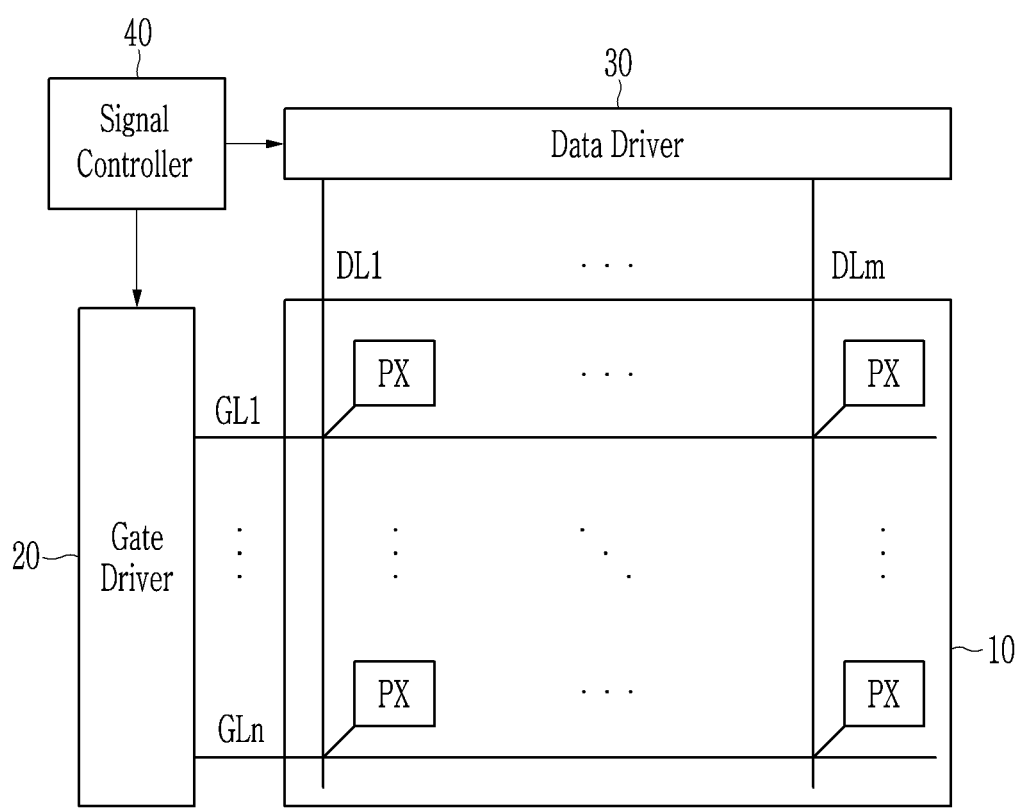
FIG. 1 illustrates a layout diagram of a display device according to an embodiment.

The present disclosure will be described more fully hereinafter with reference to the accompanying drawings, in which exemplary embodiments of the present disclosure are shown. As those skilled in the art would realize, the exemplary embodiments may be modified in various different ways, without departing from the spirit or scope of the present disclosure.

Parts that are irrelevant to the description may be omitted to clearly describe the present disclosure, and like reference numerals designate like elements throughout the specification.

Further, in the drawings, the size and thickness of each element are arbitrarily illustrated for ease of description, and the present disclosure is not necessarily limited to those illustrated in the drawings. In the drawings, the thicknesses of layers, films, panels, regions, etc., may be exaggerated for clarity. In the drawings, for ease of description, the thicknesses of some layers and areas are exaggerated.

It will be understood that when an element such as a layer, film, region, or substrate is referred to as being "on" another element, it can be directly on the other element or one or more intervening elements may also be present. In contrast, when an element is referred to as being "directly on" another element, there are no intervening elements present. Further, in the specification, the term "on" or "above" means disposed or positioned on or below an object, and does not necessarily mean disposed or positioned on the upper side of the object based on a gravitational direction.

In addition, unless explicitly described to the contrary, the term "comprise" and its variations such as "comprises" or "comprising" will be understood to imply an inclusion of stated elements but not an exclusion of any other elements.

Further, throughout the specification, the phrase "in a plan view" means viewing a target portion from the top, and the phrase "in a cross-sectional view" means viewing a cross-section formed by vertically cutting a target portion from the side.

In the drawings, as symbols used for indicating directions, 'x' is a first direction, 'y' is a second direction perpendicular to the first direction, and 'z' is a third direction perpendicular to the first direction and the second direction.

Hereinafter, as an example of a display device, a liquid crystal display according to an embodiment of the present disclosure will be described in detail with reference to the accompanying drawings.

FIG. 1 illustrates a layout diagram of a display device according to an embodiment.

Referring to FIG. 1, the display device includes a display panel 10, a gate driver 20, a data driver 30, and a signal controller 40.

The display panel 10 is connected to a plurality of gate lines GL1-GLn, a plurality of data lines DL1-DLm, and a plurality of pixels PX that are connected to the gate lines GL1-GLn and the data lines DL1-DLm and are substantially arranged in a matrix. The gate lines GL1-GLn may extend substantially in a row direction, and the data lines DL1-DLm may extend substantially in a column direction. Each pixel PX may include a switching element (e.g., a transistor) and receive a gate voltage from a corresponding gate line of the gate lines GL1-GLn. The gate voltage may include a gate-on voltage for switching on the switching element and a gate-off voltage for switching off the switching element. Each pixel PX may further receive a data voltage corresponding to an image signal from a corresponding data line of the data lines DL1-DLm when the switching element is switched on.

The signal controller 40 may provide signals for controlling the gate driver 20 and the data driver 30. The signal controller 40 may receive an image signal and a control signal for controlling the image signal from an external device such as a graphics processor, process the image signal according to an operating condition of the display panel 10, and generate and output image data, a gate control signal, a data control signal, a clock signal, etc. The gate driver 20 may receive the gate control signal from the signal controller 40, generate a gate signal, and output the gate signal to the gate lines GL1-GLn. The data driver 30 may receive the data control signal and the image data from the signal controller 40, convert the image data into a data voltage using a gray voltage generated by a gray voltage generator (not shown), and output the converted data voltage to the data lines DL1-DLm.

Figure 2:
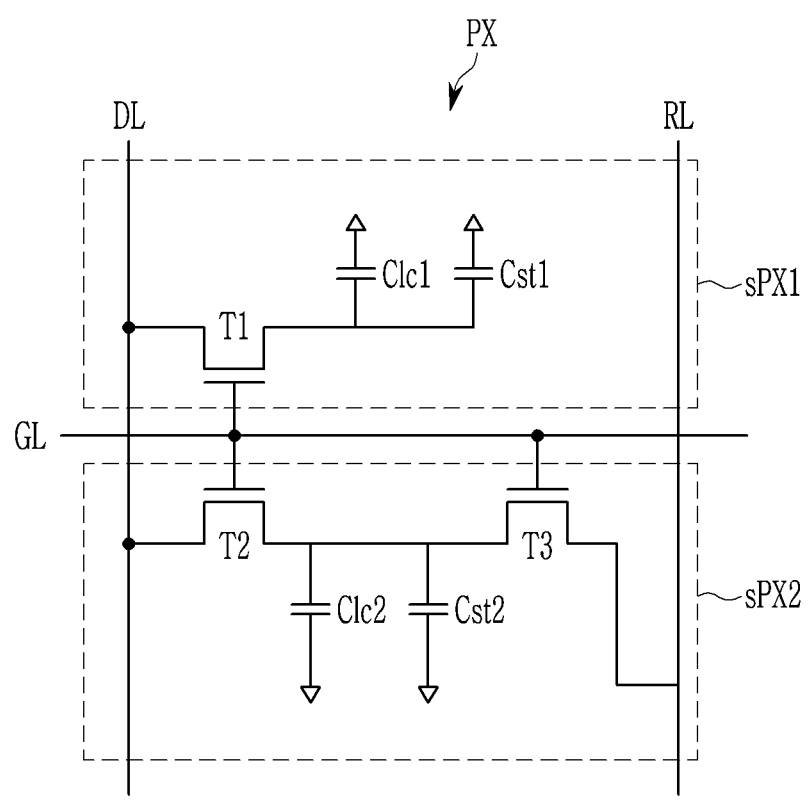
FIG. 2 illustrates an equivalent circuit diagram of one pixel of a display device according to an embodiment.

FIG. 2 illustrates an equivalent circuit diagram of one pixel of a display device according to an embodiment.

Referring to FIG. 2, a pixel PX is divided into two sub-pixels including a first sub-pixel sPX1 and a second sub-pixel sPX2, and signal lines including a gate line GL, a data line DL, and a reference voltage line RL are electrically connected to the pixel PX. The pixel PX divided into the two sub-pixels sPX1 and sPX2 may improve side visibility.

The first sub-pixel sPX1 includes a first transistor T1, a first liquid crystal capacitor Clc1, and a first storage capacitor Cst1. The second sub-pixel sPX2 includes a second transistor T2, a third transistor T3, a second liquid crystal capacitor Clc2, and a second storage capacitor Cst2.

The first transistor T1 is connected to the gate line GL and the data line DL. The second transistor T2 is also connected to the gate line GL and the data line DL. The third transistor T3 is connected to an output terminal (a source electrode or a drain electrode) of the second transistor T2 and the reference voltage line RL. The gate line GL may substantially extend in the row direction, and the data line DL and the reference voltage line RL may substantially extend in the column direction.

When a gate-on voltage is applied to the gate line GL, the first transistor T1, the second transistor T2, and the third transistor T3 connected thereto are switched on. Accordingly, the data signal applied to the data line DL is respectively applied to the first and second liquid crystal capacitors Clc1 and Clc2 through the first and second transistors T1 and T2 that are switched on, and the first and second liquid crystal capacitors Clc1 and Clc2 are respectively charged with a voltage corresponding to a difference between the data voltage and the common voltage. In this case, although the same data voltage is transmitted to the first liquid crystal capacitor Clc1 and the second liquid crystal capacitor Clc2 through the first transistor T1 and the second transistor T2, respectively, the charging voltage of the second liquid crystal capacitor Clc2 is divided through the third transistor T3. Accordingly, the charging voltage of the second liquid crystal capacitor Clc2 becomes smaller than that of the first liquid crystal capacitor Clc1, so that the two sub-pixels sPX1 and sPX2 may have different luminance. By properly adjusting a voltage charged in the first liquid crystal capacitor Clc1 and a voltage charged in the second liquid crystal capacitor Clc2, an image may be viewed similarly from a lateral surface or from a front surface, thereby improving lateral visibility of the display device.

Figure 3:
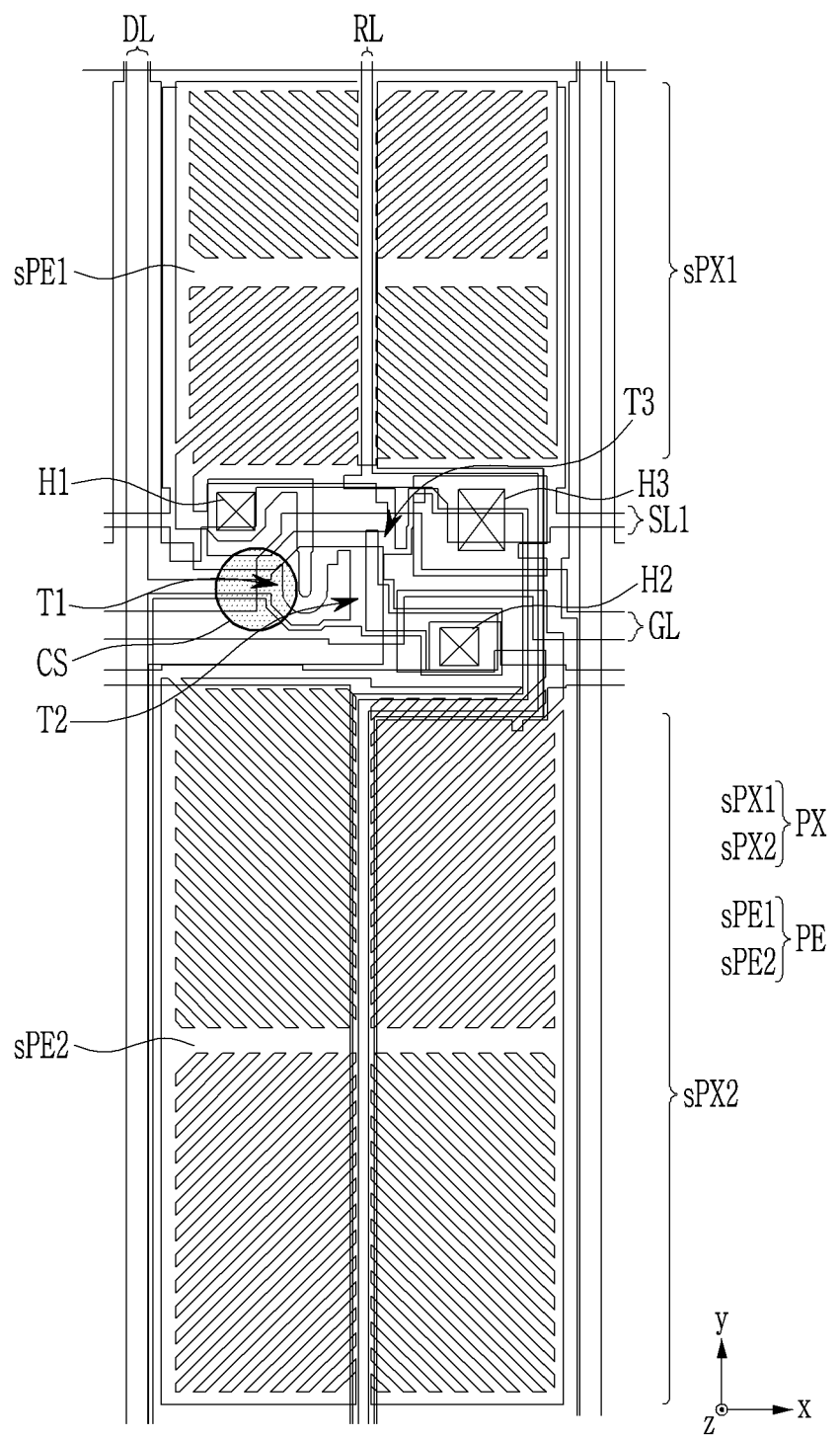
FIG. 3 illustrates a plane layout view of one pixel of a display device according to an embodiment.
Figure 4:
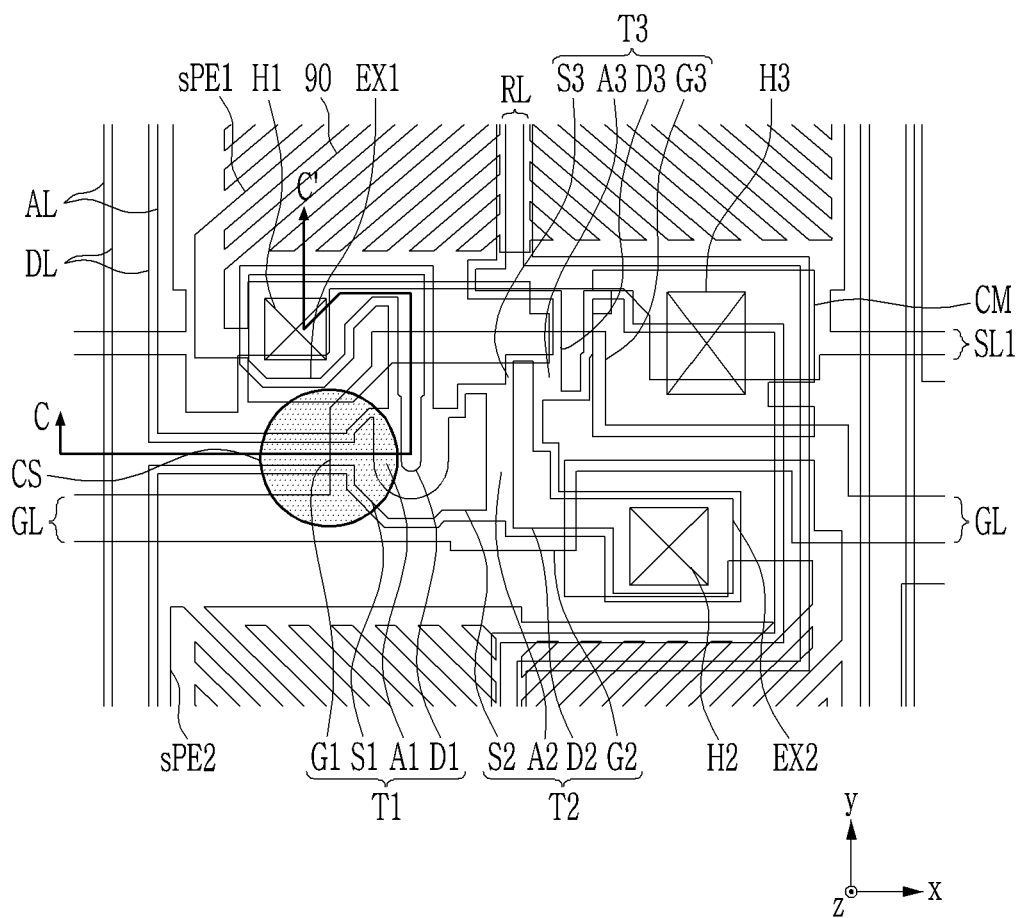
FIG. 4 illustrates an enlarged view of a region in which a transistor and a hole are disposed in FIG. 3.
Figure 5:
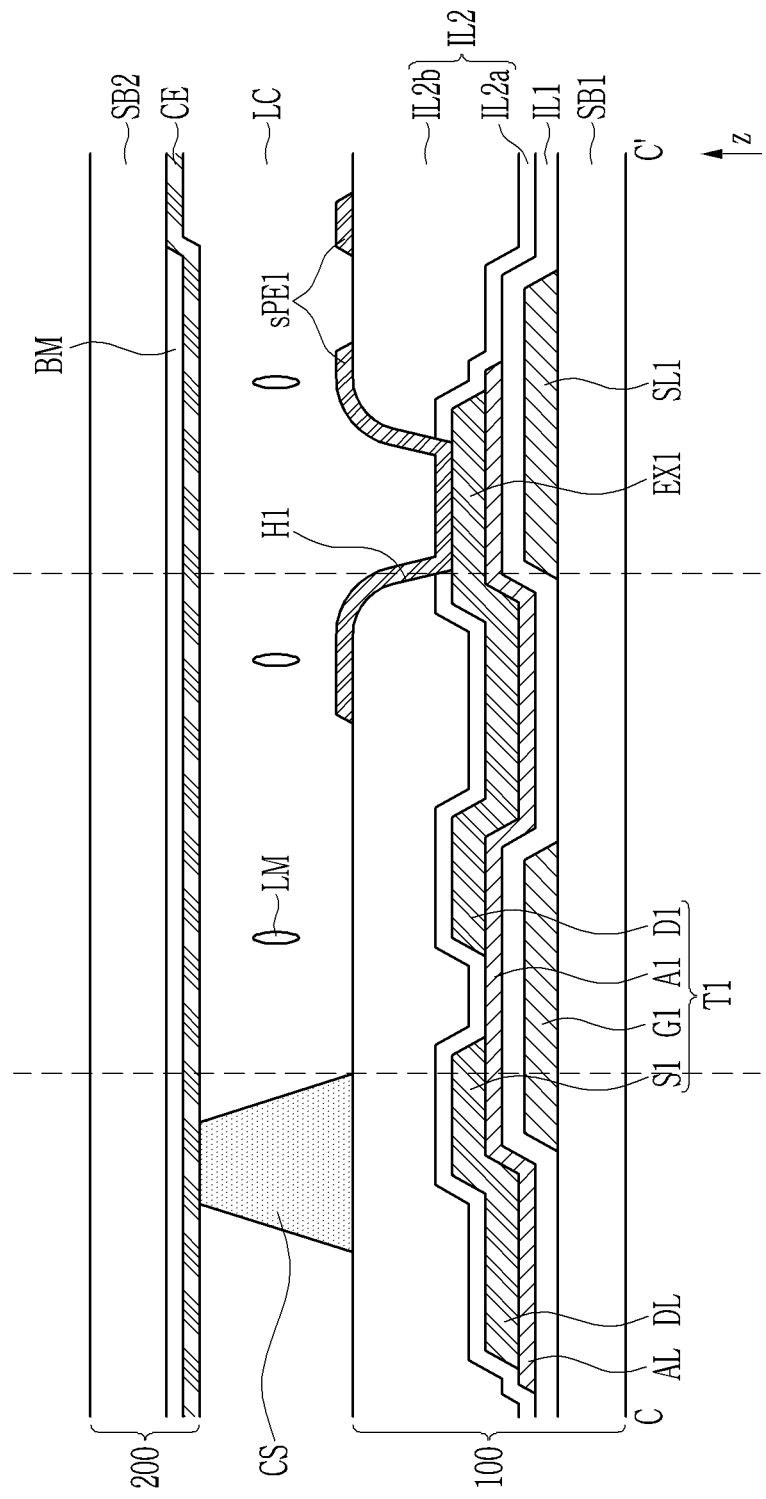
FIG. 5 illustrates a cross-sectional view taken along line C-C' of FIG. 4.

Hereinafter, the display device according to the embodiment will be described in more detail with reference to FIG. 3 to FIG. 6. FIG. 3 illustrates a plane layout view of one pixel of a display device according to an embodiment, FIG. 4 illustrates an enlarged view of a region in which a transistor and a hole are disposed in FIG. 3, and FIG. 5 illustrates a cross-sectional view taken along line C-C' of FIG. 4.

The display device according to the embodiment includes a first substrate SB1, a second substrate SB2 overlapping the first substrate SB1, and a liquid crystal layer LC disposed between the first substrate SB1 and the second substrate SB2.

A gate conductor including the gate line GL and a storage voltage line SL1 may be disposed on the first substrate SB1. The gate conductor may include a transparent insulation material such as glass or plastic.

The gate line GL for transmitting a gate voltage may substantially extend in the first direction x. The gate line GL may have portions or protrusions that form a gate electrode G1 of the first transistor T1, a gate electrode G2 of the second transistor T2, and a gate electrode G3 of the third transistor T3. In the present specification, a protrusion refers to a portion protruding in a plan view.

The storage voltage line SL may transmit a constant voltage such as a common voltage. A portion or protrusion of the storage voltage line SL may form one electrode of the first and second storage capacitors Cst1 and Cst2. The storage voltage line SL may include a portion extending substantially in the first direction x and a portion extending substantially in the second direction y.

The gate conductor may include a metal such as molybdenum (Mo), copper (Cu), aluminum (Al), magnesium (Mg), silver (Ag), gold (Au), platinum (Pt), palladium (Pd), nickel (Ni), neodymium (Nd), iridium (Ir), tungsten (W), titanium (Ti), chromium (Cr), or tantalum (Ta). The gate conductor may be formed with a single layer or a plurality of layers.

A first insulating layer IL1 may be disposed on the gate conductor. The first insulating layer IL1 may include an inorganic insulating material such as a silicon oxide and a silicon nitride. The first insulating layer IL1 may be referred to as a gate insulating layer.

Semiconductor layers including a semiconductor layer AL, a semiconductor layer A1 of the first transistor T1, a semiconductor layer A2 of the second transistor T2, and a semiconductor layer A3 of the third transistor T3 may be disposed on the first insulating layer IL1. The semiconductor layer AL overlaps the data line DL. The semiconductor layers may include a semiconductor material such as amorphous silicon, polycrystalline silicon, or oxide semiconductor.

A data conductor including the data line DL, the reference voltage line RL, a source electrode S1 and a drain electrode D1 of the first transistor T1, a source electrode S2 and a drain electrode D2 of the second transistor T2, and a source electrode S3 and a drain electrode D3 of the third transistor T3 may be disposed on the semiconductor layers.

The data line DL transmitting a data voltage may substantially extend in the second direction y. The first source electrode S1 of the first transistor T1 may correspond to a protrusion or portion of the data line DL. The second source electrode S2 of the second transistor T2 may be connected to the first source electrode S1 of the first transistor T1, and the second drain electrode D2 of the second transistor T2 may be connected to the third source electrode S3 of the third transistor T3. The third drain electrode D3 of the third transistor T3 may correspond to a protrusion or portion of the reference voltage line RL.

The first drain electrode D1 of the first transistor T1 includes an extension portion EX1 for connecting the first sub-pixel electrode sPE1, and the drain electrode D2 of the second transistor T2 includes an extension portion EX2 for connecting the second sub-pixel electrode sPE2. The extension portions EX1 and EX2 have a wider width than other portions of the drain electrodes D1 and D2.

In the first, second, and third transistors T1, T2, and T3, the source electrodes S1, S2, and S3 may be drain electrodes, and the drain electrodes D1, D2, and D3 may be source electrodes according to another embodiment. For example, a portion indicated by the reference numeral S1 in the first transistor T1 may be a drain electrode, and a portion indicated by the reference numeral D1 may be a source electrode. Thus, the extension portion EX1 of the first drain electrode D1 may correspond to an extension portion of the source electrode S1 of the first transistor T1, and the extension portion EX2 of the drain electrode D2 may correspond to an extension portion of the source electrode S2 of the second transistor T2.

The channels of the first, second, and third transistors T1, T2, and T3 may be formed between the source electrodes S1, S2, and S3 and the drain electrodes D1, D2, and D3 in the semiconductor layers A1, A2, and A3. One or more ohmic contact holes may be provided between the data conductor and the semiconductor layers AL, A1, A2, and A3.

The data conductor may include a metal such as aluminum (Al), copper (Cu), silver (Ag), gold (Au), platinum (Pt), palladium (Pd), nickel (Ni), molybdenum (Mo), tungsten (W), titanium (Ti), chrome (Cr), and tantalum (Ta). The data conductor may be formed with a single layer or a plurality of layers.

The data conductor and the semiconductor layers AL, A1, A2, and A3 may be formed together in a photolithography process using the same mask. In one embodiment, the data conductor may be formed by wet etching, and the semiconductor layers AL, A1, A2, and A3 may be formed by dry etching. The semiconductor layers AL, A1, A2, and A3 may overlap the data conductor in a region excluding the channel portions of the semiconductor layers A1, A2, and A3, edges of the semiconductor layers AL, A1, A2, and A3 may be substantially parallel to edge of the data conductor, and the widths of the semiconductor layers AL, A1, A2, and A3 may be substantially wider than that of the data conductor.

A second insulating layer IL2 may be disposed on the data conductor. The second insulating layer IL2 may have a plurality of layers and may include a first layer IL2a and a second layer IL2b. The first layer IL2a may include an inorganic insulating material such as a silicon nitride and a silicon oxide. The second layer IL2b may include an organic insulating material. The second layer IL2b may be a color filter or an organic insulating layer including a color filter.

A pixel electrode PE may be disposed on the second insulating layer IL2. The pixel electrode PE may include the first sub-pixel electrode sPE1 and the second sub-pixel electrode sPE2 that are disposed on the gate line GL. The first sub-pixel electrode sPE1 and the second sub-pixel electrode sPE2 may be physically separated. The first sub-pixel electrode sPE1 forms one electrode of the liquid crystal capacitor Clc1 of the first sub-pixel sPX1, and the second sub-pixel electrode sPE2 forms one electrode of the liquid crystal capacitor Clc2 of the second sub-pixel sPX2.

The first sub-pixel electrode sPE1 may be connected to the extension portion EX1 of the drain electrode D1 through a first hole H1 that penetrates through the second insulation layer IL2 and the first insulation layer IL1. Accordingly, the first sub-pixel electrode sPE1 may receive the data voltage from the drain electrode D1 of the first transistor T1.

Similarly to the first sub-pixel electrode sPE1, the second sub-pixel electrode sPE2 may be connected to the extension portion EX2 of the drain electrode D2 through a second hole H2 that penetrates through the second insulating layer IL2 and the first insulating layer IL1. Accordingly, the second sub-pixel electrode sPE2 may receive a data voltage from the drain electrode D2 of the second transistor T2. The reference voltage line RL and the storage voltage line SL1 may be electrically connected to each other through a third hole H3 in a lateral contact manner. The third hole H3 may include a region overlapping the reference voltage line RL and the storage voltage line SL1, and another region overlapping the storage voltage line SL1 and not overlapping the reference voltage line RL. A connecting member CM may be disposed on the second insulating layer IL2 to connect an upper surface of the reference voltage line RL and an upper surface of the storage voltage line SL1 through the third hole H3 and electrically connect the reference voltage line RL and the storage voltage line SL1. In this manner, the reference voltage line RL and the storage voltage line SL1 that are electrically connected to each other by the connecting member CM may transmit the same voltage. The reference voltage line RL and the storage voltage line SL1 may be connected in a mesh structure in the entire display panel 10. Therefore, it is possible to reduce resistance and a voltage drop of the reference voltage line RL and the storage voltage line SL1, and a uniform reference voltage and a storage voltage may be supplied to the entire display panel 10.

Slits 90 extending in different directions may be respectively formed in the first and second sub-pixel electrodes sPE1 and sPE2. Each of the first and second sub-pixel electrodes sPE1 and sPE2 may be divided into a plurality of areas by the slits 90, and tilt directions of liquid crystal molecules LM of the liquid crystal layer LC in the plurality of areas may be differently controlled, thereby realizing a wide viewing angle.

The first sub-pixel electrode sPE1 and the second sub-pixel electrode sPE2 may be formed together by forming a conductive layer on the second insulating layer IL2 and patterning the conductive layer by a photolithography process. The conductive layer may include a transparent conductive material such as an indium tin oxide (ITO) or an indium zinc oxide (IZO).

A light blocking member BM, also referred to as a black matrix, may be disposed on the second substrate SB2. The second substrate SB2 may include a transparent insulating material such as glass. The light blocking member BM may serve to prevent light leakage.

A common electrode CE may be disposed on the light blocking member BM. The common electrode CE may include a transparent conductive material such as ITO or IZO. The common electrode CE may be continuously disposed over the plurality of pixels PX, or it may be substantially and continuously disposed over the second substrate SB2.

The liquid crystal layer LC including the liquid crystal molecules LM may be disposed between the first substrate SB1 and the second substrate SB2. An alignment film (not shown) may be disposed between the sub-pixel electrodes sPE1 and sPE2 and the liquid crystal layer LC, and/or between the common electrode CE and the liquid crystal layer LC.

The display device according to the embodiment may include a column spacer CS disposed between the pixel electrode PE and the common electrode CE.

The column spacer CS may include a main spacer MCS and a sub-spacer SCS. FIG. 5 shows an embodiment in which the column spacer CS is the main spacer MCS, but the present disclosure is not limited thereto, and the column spacer CS may be the sub-spacer SCS.

According to one embodiment, the main spacer MCS has a cylindrical shape with a diameter of about 10 micrometers to about 30 micrometers and a height about 3 micrometers to 4 micrometers. Meanwhile, the sub-spacer SCS may have a size or shape different from those of the main spacer MCS, and a height difference between the main spacer and the sub-spacer may be about 0.1 micrometers to about 1 micrometer.

The column spacer CS according to the embodiment may be disposed on a flat surface of the second insulating layer IL2. When the column spacer CS is the main spacer MCS, the column spacer CS may maintain a gap between a first display panel 100 and a second display panel 200 in a normal unpressurized state. The column spacer CS may not be disposed on all of the pixels PX, and it may be disposed on some of the plurality of pixels PX.

The column spacer CS may be disposed adjacent to the first transistor T1 in a plan view as shown in FIG. 3 and FIG. 4. However, the present disclosure is not limited to this position, and the column spacer CS may be disposed at any region. In addition, an embodiment in which the column spacer CS has a circular cross-sectional shape in a plan view is shown, but the present disclosure is not limited thereto, and the column spacer CS may have various cross-sectional shapes.

The column spacer CS may not overlap a tapered region (or a non-planar region) of the second insulating layer IL2, for example, in the vicinity of the first hole H1. For example, the column spacer CS may be disposed based on i) a size distribution of the first hole H1 adjacent to the column spacer CS, ii) an overlay distribution of the first hole H1, iii) a size distribution of the column spacer CS, iv) an overlay distribution of the column spacer CS, and v) an alignment distribution between the first hole H1 and the column spacer CS. A minimal separation distance between the column spacer CS and the first hole H1 according to an embodiment may be set to be equal to a sum of root sum square (RSS) of the aforementioned i) to v) and a length of the tapered region of the second insulating layer IL2. In one embodiment, the minimal separation distance between the column spacer CS and the first hole H1 may be about 22 micrometers.

Figure 6:
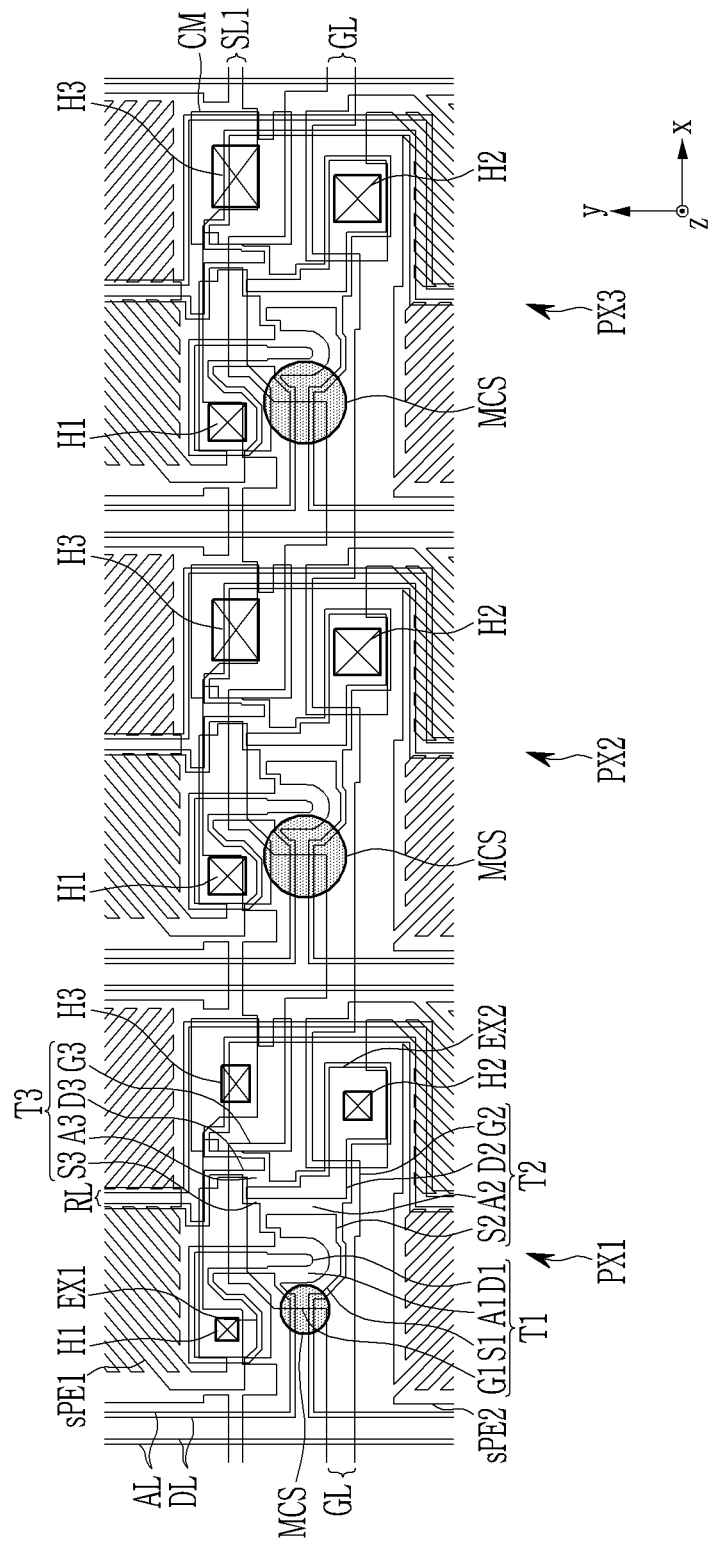
FIG. 6 illustrates a top plan view of a main spacer disposed in a plurality of pixels according to an embodiment.
Figure 7:
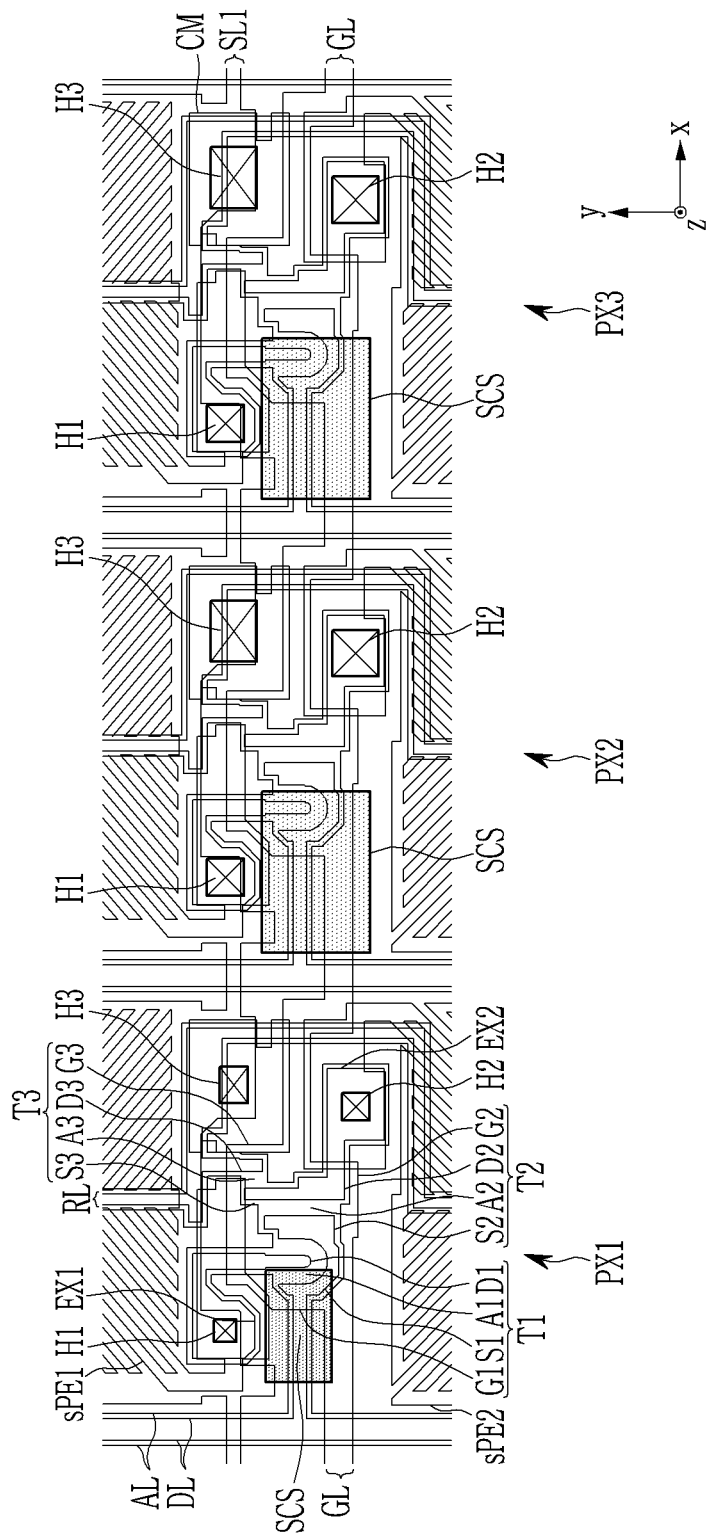
FIG. 7 illustrates a top plan view of sub-spacers disposed in a plurality of pixels according to an embodiment.

Hereinafter, a spatial relationship between the column spacer CS and the first hole H1 will be described with reference to FIG. 6 and FIG. 7. FIG. 6 illustrates a top plan view of main spacers MCS disposed in a plurality of pixels PX according to an embodiment, and FIG. 7 illustrates a top plan view of sub-spacers SCS disposed in a plurality of pixels PX according to an embodiment.

Referring to FIG. 6, the plurality of pixels PX may include a first pixel PX1 including a first color filter, a second pixel PX2 including a second color filter, and a third pixel PX3 including a third color filter. In the embodiment, the first pixel PX1 may display a red color, the second pixel PX2 may display a green color, and the third pixel PX3 may display a blue color.

Each of the first pixel PX1, the second pixel PX2, and the third pixel PX3 may include the first, second, and third holes H1, H2, and H3. The first, second, and third pixels PX1, PX2, and PX3 according to the embodiment may include the first, second, and third holes H1, H2, and H3 having different sizes. For example, sizes of the first hole H1 included in the first pixel PX1, the first hole H1 included in the second pixel PX2, and the first hole H1 included in the third pixel PX3 may be different from each other. In another example, some of the first pixel PX1, the second pixel PX2, and the third pixel PX3 may have the first hole H1 of the same size. Similarly, sizes of the second hole H2 included in the first pixel PX1, the second hole H2 included in the second pixel PX2, and the second hole H2 included in the third pixel PX3 may be different from each other. In another example, some of the first pixel PX1, the second pixel PX2, and the third pixel PX3 may have the second hole H2 of the same size. In addition, sizes of the third hole H3 included in the first pixel PX1, the third hole H3 included in the second pixel PX2, and the third hole H3 included in the third pixel PX3 may be different from each other. In another example, some of the first pixel PX1, the second pixel PX2, and the third pixel PX3 may have the third hole H3 of the same size.

In the embodiment, in a plan view, an area of the first hole H1 included in the first pixel PX1 may be the smallest, and an area of the first hole H1 included in the third pixel PX3 may be the largest. An area of the first hole H1 included in the second pixel PX2 may be equal to or larger than that of the first hole H1 included in the first pixel PX1, and equal to or smaller than that of the first hole H1 included in the third pixel PX3. The planar areas of the first holes H1, when viewed in a plan view, may increase in order of the first pixel PX1, the second pixel PX2, and the third pixel PX3.

Similarly, in a plan view, an area of the second hole H2 included in the first pixel PX1 may be the smallest, and an area of the second hole H2 included in the third pixel PX3 may be the largest. An area of the second hole H2 included in the second pixel PX2 may be equal to or larger than that of the second hole H2 included in the first pixel PX1, and equal to or smaller than that of the second hole H2 included in the third pixel PX3. The planar areas of the second holes H2 may increase in order of the first pixel PX1, the second pixel PX2, and the third pixel PX3.

In addition, in a plan view, an area of the third hole H3 included in the first pixel PX1 may be the smallest, and an area of the third hole H3 included in the third pixel PX3 may be the largest. An area of the third hole H3 included in the second pixel PX2 may be equal to or larger than that of the third hole H3 included in the first pixel PX1, and equal to or smaller than that of the third hole H3 included in the third pixel PX3. The planar areas of the third holes H3 may increase in order of the first pixel PX1, the second pixel PX2, and the third pixel PX3.

The display device according to the embodiment may include the main spacers MCS having different sizes. Specifically, the main spacers MCS disposed in the first pixel PX1, the second pixel PX2, and the third pixel PX3 may have different planar areas. The column spacer CS may have a varying planar area in the z-direction as shown in FIG. 5. The planar areas of the main spacers MCS may be compared based on the largest planar area of each of the main spacer MCS.

In the embodiment, the planar area of the main spacer MCS may increase in order of the first pixel PX1, the second pixel PX2, and the third pixel PX3. A planar area of the main spacer MCS disposed in the first pixel PX1 may be the smallest, and a planar area of the main spacer MCS disposed in the third pixel PX3 may be the largest. A planar area of the main spacer MCS disposed in the second pixel PX2 may be equal to or larger than that of the main spacer MCS disposed in the first pixel PX1, and equal to or smaller than that of the main spacer MCS disposed in the third pixel PX3.

In the embodiment, the larger the planar area of the first hole H1 is, the smaller a straight line distance from the first hole H1 to the main spacer MCS may be.

A straight line distance between the main spacer MCS and the first hole H1 disposed in the first pixel PX1 may be greater than that between the main spacer MCS and the first hole H1 disposed in the second pixel PX2. A straight line distance between the main spacer MCS and the first hole H1 disposed in the second pixel PX2 may be equal to or greater than that between the main spacer MCS and the first hole H1 disposed in the third pixel PX3.

As a planar area of the first hole H1 is smaller, an area of the tapered region of the second insulating layer IL2 may be smaller. Therefore, the main spacer MCS may be disposed on a flat area of the second insulating layer IL2, and an area occupied by the main spacer MCS may be relatively small compared to the overall flat area of the second insulating layer IL2.

In contrast, as a planar area of the first hole H1 is larger, an area of the tapered second insulating layer IL2 may be larger. At least a portion of the main spacer MCS may be disposed on the tapered portion of the second insulating layer IL2. In one embodiment, the main spacer MCS disposed in the second pixel PX2 or the third pixel PX3 has a larger planar area than the main spacer MCS disposed in the first pixel PX1 to stably maintain a gap between the first display panel 100 and the second display panel 200.

Next, referring to FIG. 7, the plurality of pixels PX according to the embodiment may include sub-spacers SCS. The sub-spacer SCS may maintain a gap between the first display panel 100 and the second display panel 200 in a pressurized situation. The heights of the sub-spacer SCS and the main spacer MCS described with reference to FIG. 6 may be different from each other. For example, the height of the main spacer MCS may be greater than that of the sub-spacer SCS. The sub-spacer SCS may not be disposed on all the first, second, and third pixels PX1, PX2, and PX3, but may be disposed on some of the plurality of first, second, and third pixels PX1, PX2, and PX3.

Each of the first pixel PX1, the second pixel PX2, and the third pixel PX3 may include the first, second, and third holes H1, H2, and H3. In this case, sizes of the first hole H1 included in the first pixel PX1, the first hole H1 included in the second pixel PX2, and the first hole H1 included in the third pixel PX3 may be different from each other. In another example, some of the first pixel PX1, the second pixel PX2, and the third pixel PX3 may have the first hole H1 of the same size. Similarly, sizes of the second hole H2 included in the first pixel PX1, the second hole H2 included in the second pixel PX2, and the second hole H2 included in the third pixel PX3 may be different from each other. In another example, some of the first pixel PX1, the second pixel PX2, and the third pixel PX3 may have the second hole H2 of the same size. In addition, sizes of the third hole H3 included in the first pixel PX1, the third hole H3 included in the second pixel PX2, and the third hole H3 included in the third pixel PX3 may be different from each other. In another example, some of the first pixel PX1, the second pixel PX2, and the third pixel PX3 may have the third hole H3 of the same size.

In a plan view, an area of the first hole H1 included in the first pixel PX1 may be the smallest, and an area of the first hole H1 included in the third pixel PX3 may be the largest. An area of the first hole H1 included in the second pixel PX2 may be equal to or larger than that of the first hole H1 included in the first pixel PX1, and equal to or smaller than that of the first hole H1 included in the third pixel PX3. The planar areas of the first holes H1 may increase in order of the first pixel PX1, the second pixel PX2, and the third pixel PX3.

Similarly, in a plan view, an area of the second hole H2 included in the first pixel PX1 may be the smallest, and an area of the second hole H2 included in the third pixel PX3 may be the largest. An area of the second hole H2 included in the second pixel PX2 may be equal to or larger than that of the second hole H2 included in the first pixel PX1, and equal to or smaller than that of the second hole H2 included in the third pixel PX3. The planar areas of the second holes H2 may increase in order of the first pixel PX1, the second pixel PX2, and the third pixel PX3.

In addition, in a plan view, an area of the third hole H3 included in the first pixel PX1 may be the smallest, and an area of the third hole H3 included in the third pixel PX3 may be the largest. An area of the third hole H3 included in the second pixel PX2 may be equal to or larger than that of the third hole H3 included in the first pixel PX1, and equal to or smaller than that of the third hole H3 included in the third pixel PX3. The planar areas of the third holes H3 may increase in order of the first pixel PX1, the second pixel PX2, and the third pixel PX3.

The display device according to the embodiment may include the sub-spacers SCS having different sizes. Specifically, the sub-spacers SCS disposed in the first pixel PX1, the second pixel PX2, and the third pixel PX3 may have different planar areas. The planar area of the sub-spacers SCS may be compared based on the largest planar area of each of the sub-spacers SCS.

In the embodiment, a planar area of the sub-spacers SCS disposed in the first pixel PX1 may be the smallest, and a planar area of the sub-spacers SCS disposed in the third pixel PX3 may be the largest. A planar area of the sub-spacers SCS disposed in the second pixel PX2 may be equal to or larger than that of the sub-spacers SCS disposed in the first pixel PX1, and equal to or smaller than that of the sub-spacers SCS disposed in the third pixel PX3. The present disclosure is not limited thereto, but the planar area of the sub-spacer SCS may increase in order of the first pixel PX1, the second pixel PX2, and the third pixel PX3.

In the embodiment, the larger the planar areas of the first, second, and third holes H1, H2, and H3 are, the smaller the straight line distances from the first, second, and third holes H1, H2, and H3 to the sub-spacers SCS may be.

A straight line distance between the sub-spacer SCS and the first hole H1 disposed in the first pixel PX1 may be greater than that between the sub-spacer SCS and the first hole H1 disposed in the second pixel PX2. A straight line distance between the sub-spacer SCS disposed and the first hole H1 in the second pixel PX2 may be equal to or greater than that between the sub-spacer SCS and the first hole H1 disposed in the third pixel PX3.

As a planar area of the first hole H1 is smaller, an area of the tapered region of the second insulating layer IL2 may be smaller. Therefore, the sub-spacer SCS may be disposed on a flat area of the second insulating layer IL2, and an area occupied by the sub-spacer SCS may be relatively small compared to the overall flat area of the second insulating layer IL2.

In contrast, as a planar area of the first hole H1 is larger, an area of the tapered second insulating layer IL2 may be larger. At least a portion of the sub-spacer SCS may be disposed on the tapered portion of the second insulating layer IL2. In one embodiment, the sub-spacer SCS disposed in the second pixel PX2 or the third pixel PX3 has a larger planar area than the sub-spacer SCS disposed in the first pixel PX1 to stably maintain a gap between the first display panel 100 and the second display panel 200.

Figure 8:
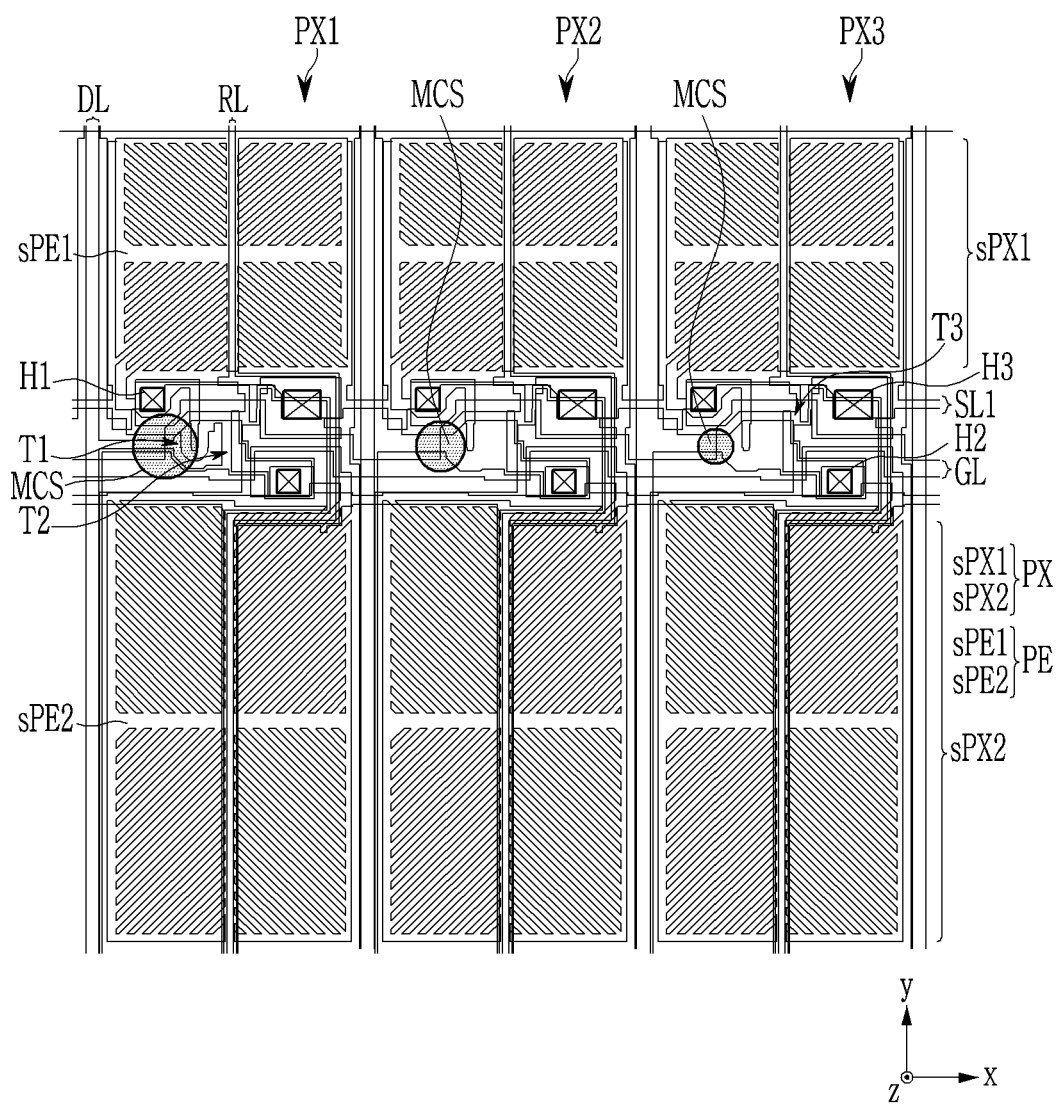
FIG. 8 illustrates a top plan view of a plurality of pixels including main spacers according to an embodiment.
Figure 9:
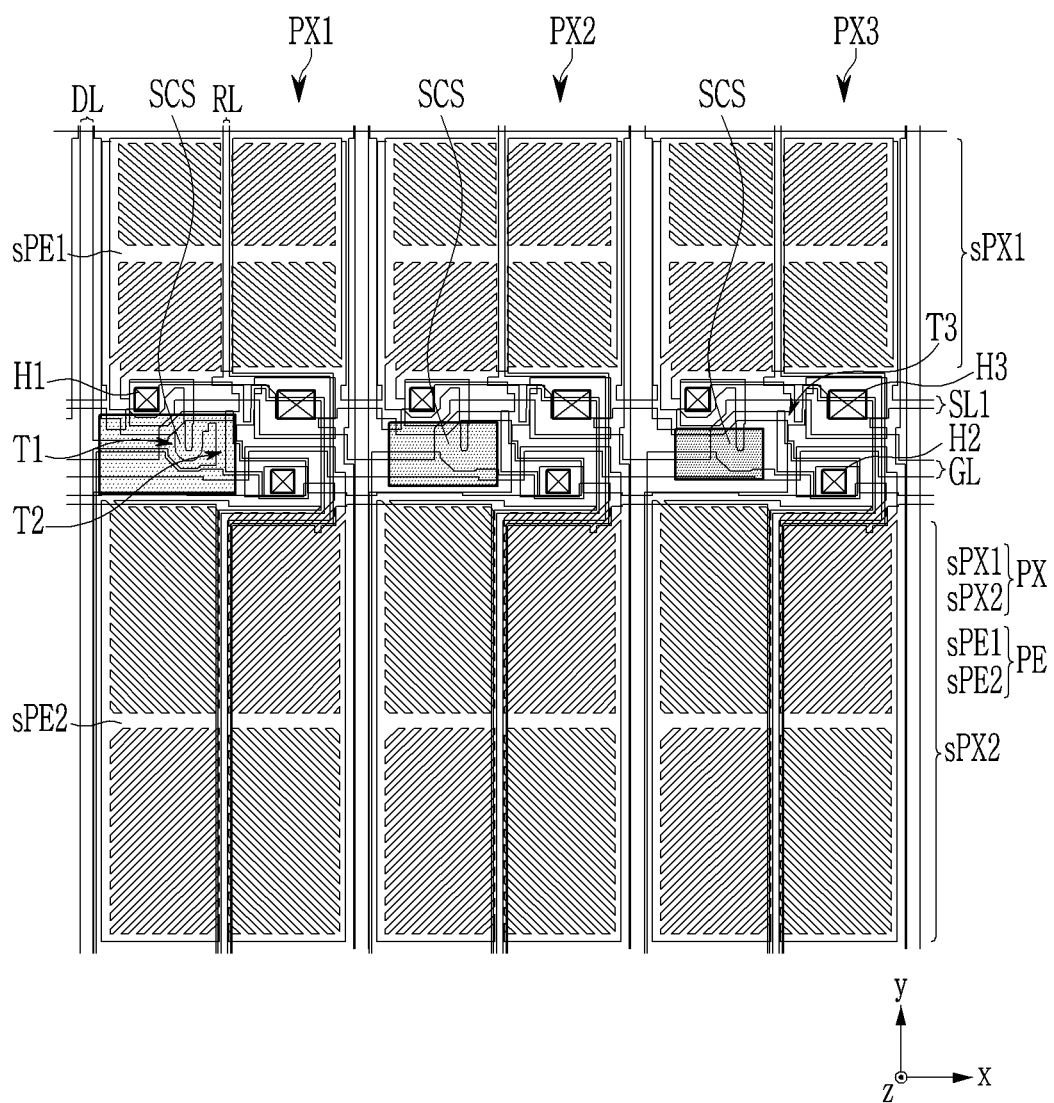
FIG. 9 illustrates a top plan view of a plurality of pixels including sub-spacers according to an embodiment.

Hereinafter, a display device according to an embodiment will be described with reference to FIG. 8 and FIG. 9. FIG. 8 illustrates a top plan view of a plurality of pixels including main spacers MCS according to an embodiment, and FIG. 9 illustrates a top plan view of a plurality of pixels including sub-spacers SCS according to an embodiment. A description of the constituent elements described above may be omitted.

Referring to FIG. 8, the plurality of pixels PX may include a first pixel PX1 including a first color filter, a second pixel PX2 including a second color filter, and a third pixel PX3 including a third color filter. In this embodiment, the sizes of the first hole H1 included in the first pixel PX1, the second pixel PX2, and the third pixel PX3 may be substantially the same.

The main spacers MCS may have different sizes from each other. Specifically, the main spacer MCS disposed in the first pixel PX1, the main spacer MCS disposed in the second pixel PX2, and the main spacer MCS disposed in the third pixel PX3 may have different planar areas. The planar area of the main spacers MCS may be compared based on the largest planar area of each of the main spacers MCS.

In the present embodiment, the planar area of the main spacers MCS may be reduced in order of the first pixel PX1, the second pixel PX2, and the third pixel PX3. The planar area of the main spacer MCS disposed in the first pixel PX1 may be the largest, and the planar area of the main spacer MCS disposed in the third pixel PX3 may be the smallest. The planar area of the main spacer MCS disposed in the second pixel PX2 may be equal to or larger than that of the main spacer MCS disposed in the third pixel PX3, and equal to or smaller than that of the main spacer MCS disposed in the first pixel area PX1.

The larger an area occupied by the main spacer MCS is, the smaller a straight line distance between the main spacer MCS and the first hole H1 may be. A straight line distance between the main spacer MCS and the first hole H1 disposed in the first pixel PX1 may be smaller than that between the main spacer MCS and the first hole H1 disposed in the second pixel PX2. A straight line distance between the main spacer MCS and the first hole H1 disposed in the second pixel PX2 may be smaller than that between the main spacer MCS and the first hole H1 disposed in the third pixel PX3.

When the planar areas of the first holes H1 are the same, the areas of the main spacers MCS may be different according to the straight line distances between the main spacers MCS and the first holes H1. The smaller the straight line distance between the main spacer MCS and the first hole H1 is, the larger the area in which the main spacer MCS overlaps the tapered region of the second insulating layer IL2 may be. The smaller the straight line distance between the main spacer MCS and the first hole H1 is, the larger the planar area occupied by the main spacer MCS may be. Therefore, the main spacer MCS may stably maintain a gap between the first display panel 100 and the second display panel 200 in the plurality of pixels PX.

Referring to FIG. 9, the plurality of pixels PX may include a first pixel PX1 including a first color filter, a second pixel PX2 including a second color filter, and a third pixel PX3 including a third color filter. In this embodiment, the sizes of the first hole H1 included in the first pixel PX1, the second pixel PX2, and the third pixel PX3 may be substantially the same.

The sub-spacers SCS may have different sizes from each other. Specifically, the sub-spacers SCS disposed in the first pixel PX1, the sub-spacers SCS disposed in the second pixel PX2, and the sub-spacers SCS disposed in the third pixel PX3 may have different planar areas. The planar areas of the sub-spacers SCS may be compared based on the largest planar area of each of the sub-spacers SCS.

In the present embodiment, the planar area of the sub-spacers SCS may be reduced in order of the first pixel PX1, the second pixel PX2, and the third pixel PX3. The planar area of the sub-spacer SCS disposed in the first pixel PX1 may be the largest, and the planar area of the sub-spacer SCS disposed in the third pixel PX3 may be the smallest. The planar area of the sub-spacer SCS disposed in the second pixel PX2 may be equal to or larger than that of the sub-spacer SCS disposed in the third pixel PX3, and equal to or smaller than that of the sub-spacer SCS disposed in the first pixel PX1.

The larger an area occupied by the sub-spacer SCS is, the smaller a straight line distance between the sub-spacer SCS and the first hole H1 may be. A straight line distance between the sub-spacer SCS and the first hole H1 disposed in the first pixel PX1 may be smaller than that between the sub-spacer SCS and the first hole H1 disposed in the second pixel PX2. A straight line distance between the sub-spacer SCS and the first hole H1 disposed in the second pixel PX2 may be smaller than that between the sub-spacer SCS and the first hole H1 disposed in the third pixel PX3.

When the planar areas of the first holes H1 are the same, the areas of the sub-spacers SCS may be different according to the straight line distances between the sub-spacers SCS and the first holes H1. The smaller the straight line distance between the sub-spacer SCS and the first hole H1 is, the larger the area in which the sub-spacer SCS overlaps the tapered region of the second insulating layer IL2 may be. The smaller the straight line distance between the sub-spacer SCS and the first hole H1 is, the larger the planar area occupied by the sub-spacer SCS may be. Therefore, the sub-spacer SCS may stably maintain a gap between the first display panel 100 and the second display panel 200 in the plurality of pixels PX.

According to the above-described embodiment, the column spacers CS (the main spacers MCS and/or the sub-spacers SCS) are stably formed irrespective of a position adjacent to the first hole H1, a gap defect or a smear margin change that may be caused by a pressure change may be prevented.

Figure 10:
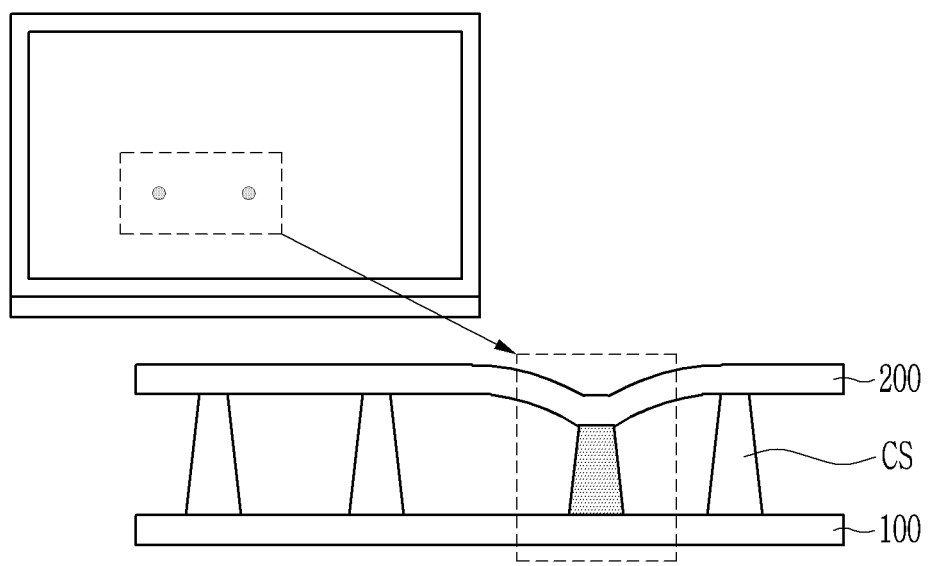
FIG. 10 illustrates a schematic view of a display device according to a comparative example.

Hereinafter, a display device according to a comparative example will be described. FIG. 10 illustrates a schematic view of a display device according to a comparative example.

Referring to FIG. 10, the column spacer CS is disposed in a tapered region of the second insulating layer IL2, therefore it may be difficult for the column spacer CS to maintain a gap between the first display panel 100 and the second display panel 200. An amount of the elastic recovery force of the column spacer CS may be smaller than that of the above-described embodiments of the present disclosure due to a height change of the column spacer CS, therefore a gap spot may be caused due to the height change of the column spacer CS.

While the present disclosure has been described in connection with what is presently considered as practical embodiments, it is to be understood that the present disclosure is not limited to the exemplary embodiments disclosed herein, but, on the contrary, is intended to cover various modifications and equivalent arrangements included within the spirit and scope of the present disclosure as reflected in the appended claims.

DESCRIPTION OF SYMBOLS

SB1: first substrate
SB2: second substrate
T1: first transistor, T2: second transistor, T3: third transistor
PE: pixel electrode
CE: common electrode
CS: column spacer
MCS: main spacer
SCS: sub-spacer
PX1: first pixel, PX2: second pixel, PX3: third pixel
H1: first hole, H2: second hole, H3: third hole

What is claimed is:
1. A display device comprising:
a first substrate;
a second substrate overlapping the first substrate;
a common electrode disposed on the second substrate; and
a plurality of pixels comprising:
 a first pixel displaying a first color;
 a second pixel displaying a second color; and
 a third pixel displaying a third color, wherein each of the plurality of pixels comprising a transistor disposed on the first substrate and a pixel electrode electrically connected to the transistor through a hole, wherein the display device further comprises a plurality of column spacers respectively disposed in the first pixel, the second pixel, and the third pixel between the pixel electrode and the common electrode, wherein the plurality of column spacers includes a main spacer having a first height and a sub-spacer having a second height that is different from the first height, and wherein planar areas of the plurality of column spacers are different from one another and increase in an order of the first pixel, the second pixel, and the third pixel;

wherein straight line distances between each of the first, second, and third column spacer and correspondingly each hole connecting the pixel electrode and the transistor are different from one another.

2. The display device of claim 1, wherein
a planar area of a first main spacer disposed in the first pixel is smaller than that of a third main spacer disposed in the third pixel.

3. The display device of claim 2, wherein
a straight line distance between the first main spacer and a first hole disposed in the first pixel is greater than that between the third main spacer and a third hole disposed in the third pixel.

4. The display device of claim 1, wherein
a planar area of a second main spacer disposed in the second pixel is smaller than or equal to that of a third main spacer disposed in the third pixel.

5. The display device of claim 4, wherein
a straight line distance between the second main spacer and a second hole disposed in the second pixel is greater than or equal to that between the third main spacer and a third hole disposed in the third pixel.

6. The display device of claim 1, wherein
a planar area of a first sub-spacer disposed in the first pixel is smaller than that of a third sub-spacer disposed in the third pixel.

7. The display device of claim 6, wherein
a straight line distance between the first sub-spacer and a first hole disposed in the first pixel is greater than that between the third sub-spacer and a third hole disposed in the third pixel.

8. The display device of claim 1, wherein
a planar area of a second sub-spacer disposed in the second pixel is smaller than or equal to that of a third sub-spacer disposed in the third pixel.

9. The display device of claim 8, wherein
a straight line distance between the second sub-spacer and a second hole disposed in the second pixel is greater than or equal to that between the third sub-spacer and a third hole disposed in the third pixel.

10. The display device of claim 1, wherein
the first pixel displays a red color, the second pixel displays a green color, and the third pixel displays a blue color.

11. The display device of claim 1, wherein
a first hole included in the first pixel, a second hole included in the second pixel, and a third hole included in the third pixel have different sizes.

12. The display device of claim 11, wherein
a planar size of the first hole included in the first pixel is smaller than that of the third hole included in the third pixel.

13. The display device of claim 1, wherein
a first hole included in the first pixel, a second hole included in the second pixel, and a third hole included in the third pixel have a same size.

14. The display device of claim 13, wherein
a planar size of a third column spacer included in the third pixel is smaller than that of a first column spacer included in the first pixel.

15. A display device comprising:
a first substrate;
a second substrate overlapping the first substrate;
a common electrode disposed on the second substrate;
a plurality of pixels comprising a first pixel a second pixel, and a third pixel; and
a plurality of column spacers respectively disposed in the first pixel, the second pixel, and the third pixel between the pixel electrode and the common electrode, wherein the first pixel includes a first pixel electrode electrically connected to a first transistor disposed on the first substrate through a first hole, wherein the second pixel includes a second pixel electrode electrically connected to a second transistor disposed on the first substrate through a second hole, wherein the third pixel includes a third pixel electrode electrically connected to a third transistor disposed on the first substrate through a third hole, wherein the first pixel displays a first color, the second pixel displays a second color, and the third pixel displays a third color, and wherein planar areas of a first column spacer in the first pixel, a second column spacer in the second pixel, and a third column spacer in the third pixel decrease in an order of the first pixel, the second pixel, and the third pixel;

wherein straight line distances between each of the first, second, and third column spacer and correspondingly each hole connecting the pixel electrode and the transistor are different from one another.

16. The display device of claim 15, wherein the first hole included in the first pixel, the second hole included in the second pixel, and the third hole included in the third pixel have a same planar size.

17. The display device of claim 16, wherein
a third distance between a third column spacer and the third hole included in the third pixel is greater than a first distance between a first column spacer and the first hole included in the first pixel.

* * * * *